United States Patent
Friedl et al.

(10) Patent No.: US 9,348,552 B2
(45) Date of Patent: May 24, 2016

(54) NETWORK APPLIANCE FOR TRANSCODING OR ENRICHING VIRTUAL DESKTOP INFRASTRUCTURE DESKTOP IMAGES

(75) Inventors: Stephan Edward Friedl, Frederick, CO (US); Steven Chervets, Longmont, CO (US); Thomas Martin Wesselman, Issaquah, WA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 13/297,792

(22) Filed: Nov. 16, 2011

(65) Prior Publication Data

US 2013/0120455 A1 May 16, 2013

(51) Int. Cl.
G09G 5/00 (2006.01)
G06F 3/14 (2006.01)
G09G 5/36 (2006.01)
G09G 5/28 (2006.01)

(52) U.S. Cl.
CPC .. *G06F 3/14* (2013.01); *G09G 5/36* (2013.01); G06F 3/1454 (2013.01); G09G 5/28 (2013.01)

(58) Field of Classification Search
None
See application file for complete search history.

(56) References Cited

U.S. PATENT DOCUMENTS

| | | |
|---|---|---|
| 2007/0216687 A1 | 9/2007 | Kaasila |
| 2007/0279418 A1 | 12/2007 | Carter-Schwendler |
| 2010/0049740 A1 | 2/2010 | Iwase |
| 2010/0271379 A1* | 10/2010 | Byford et al. ............ 345/545 |
| 2010/0329572 A1 | 12/2010 | Kamay |
| 2011/0078532 A1 | 3/2011 | Vonog |
| 2011/0126110 A1 | 5/2011 | Vilke |
| 2011/0224811 A1 | 9/2011 | Lauwers |
| 2012/0151373 A1* | 6/2012 | Kominac ........ G06F 17/30905 715/740 |

FOREIGN PATENT DOCUMENTS

EP 2244183 A2 10/2010

OTHER PUBLICATIONS

PCT/US12/65195 International Search Report and Written Opinion of the International Searching Authority dated May 7, 2013.
Joint Cisco and VMware Solution for Optimizing Virtual Desktop Delivery; Data Center 3.0: Solutions to Accelerate Data Center Virtualization 2008.
International Preliminary Report on Patentability for International Application No. PCT/US2012/065195 dated May 20, 2014.

* cited by examiner

*Primary Examiner* — Xiao Wu
*Assistant Examiner* — Mohammad H Akhavannik
(74) *Attorney, Agent, or Firm* — Patterson + Sheridan, LLP (57) ABSTRACT

Disclosed in an example embodiment herein is an apparatus that comprises an interface for receiving image data from a hosted virtual desktop and sending a desktop image to a client device and graphical processing logic coupled with the interface. The graphical processing logic receives the image data via the interface and performs a graphical processing operation on the image data to create a desktop image. The graphical processing logic employs the interface to provide the desktop image to the client device.

21 Claims, 4 Drawing Sheets

NETWORK APPLIANCE FOR TRANSCODING OR ENRICHING VIRTUAL DESKTOP INFRASTRUCTURE DESKTOP IMAGES

TECHNICAL FIELD

The present disclosure relates generally to hosted virtual desktops.

BACKGROUND

Improvements to desktop visual rendering can enhance productivity and be aesthetically pleasing. For example, the use of font smoothing for rendering text, which improves the readability of text displayed on a high resolution monitors, such as LCD displays, can improve productivity. Aesthetic improvements, such as animated bitmaps, can permit customization to a desktop's visual appearance and can increase end user productivity by elegantly conveying more information about the desktop environment using the same screen area.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus that comprises an interface for receiving image data from a hosted virtual desktop and sending a desktop image to a client device and graphical processing logic coupled with the interface. The graphical processing logic receives the image data via the interface and performs a graphical processing operation on the image data to create a desktop image. The graphical processing logic employs the interface to provide the desktop image to the client device.

In accordance with an example embodiment, there is disclosed herein logic encoded in a non-transitory computer readable medium for execution by a processor. The logic when executed is operable to receive image data from a hosted virtual desktop, perform a graphical processing operation to create a desktop image, and transmit the desktop image to the client device.

In accordance with an example embodiment, there is disclosed herein a method that comprises receiving text data and graphical data associated with an image from a hosted virtual desktop. The method further comprises determining a graphical operation to be performed on a selected one of the group consisting of the text data and graphical data. The graphical operation is performed on the selected one of the group consisting of the text data and graphical data, creating a virtual desktop image. The virtual desktop image is sent to a desktop client associated with the hosted virtual desktop.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed a device, which may be referred to as a network appliance or network element, employing a back to back user agent (B2BUA) for one or more Virtual Desktop Infrastructure (VDI) protocols which provides central processing unit (CPU) and bandwidth consuming image processing operations to a VDI desktop image. This allows Information Technology (IT) administrators to configure desktops for maximum density and bandwidth conservation while still providing an optimized visual experience for end-users.

In an example embodiment, the device provides VDI desktop image enhancement for 'local' image processing operations. An example of a 'local' image processing operation is font smoothing. Font smoothing tends to be limited to individual glyphs or combinations of glyphs. Font smoothing does not require operations that span large sections of the VDI image nor does it depend on a series of temporally distinct images. Font smoothing can be applied to a static bitmap image or a desktop window image constructed from individual glyphs. In particular embodiments, the image processing operation could be facilitated with additional metadata that could be embedded in the VDI. Another example of a local image processing operation that can be performed is Window decorations. For example, buttons can be very simple when sent from the HVD, but can be made glossy by decorating them.

Animated bitmaps are another example of a 'local' image processing operation. The device can be provided with a series of animated bitmap images that are cached locally. The device could overlay a static VDI desktop image with the appropriate bitmap from the animation series on a VDI image by image basis.

In particular embodiments, transparency and background image effects can also be applied by the device to the VDI desktop image. Data, such as metadata, in the VDI stream can be employed to specify the desired effects. Example embodiments may employ any suitable VDI protocol such as ICA (Independent Computing Architecture), PCoIP (PC over IP) and RDP (Remote Desktop Protocol) that have facilities for 'virtual channels' that desktop processes can use to embed additional information like metadata into the VDI protocol session.

Additional embodiments provide VDI image transcoding. For instance, after applying font smoothing or other operations to the VDI desktop image, the image could be transcoded to a different VDI protocol for a given VDI endpoint or could be transcoded to a conventional streaming media format like H.264 for display on any compatible media device. This mechanism could also apply to systems like X Windows where the embodiment could employ a Window Manager that decorates the Desktop and then passes the generated, decorated desktop to a VDI endpoint. In this way, an XWindow Desktop can be converted into an existing VDI protocol, like ICA, or RDP without using any kind of VDI user agent to run in the HVD.

In an example embodiment, the device could be placed in a data center to offload CPU resources from HVD desktops. In another example embodiment, the device could be placed in wiring closets or branches close to end users to provide both CPU offloading from the HVD desktop as well as reducing bandwidth consumption through portions of the network.

Figure 1:
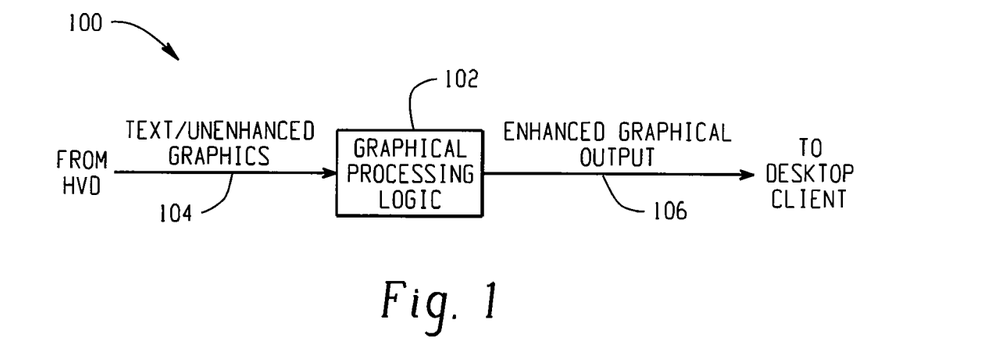
FIG. 1 is a block diagram of an apparatus for performing graphical operations in a Virtual Desktop Infrastructure (VDI).

FIG. 1 is a block diagram of an apparatus 100 for performing graphical operations in a Virtual Desktop Infrastructure (VDI). The apparatus 100 comprises graphical processing logic (which may also be referred to herein as a graphical processing unit or "GPU") that receives image data such as text and/or unenhanced graphics 104 from a hosted virtual desktop (HVD). "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. The graphical processing logic 102 performs a graphical processing operation on the image data to create a desktop image 106. The desktop image, an enhanced graphical output, 106 is provided to a desktop client. In an example embodiment, the desktop image 106 is a fully rendered bitmap image that can be provided to a display buffer of a desktop client (not shown, see e.g., FIG. 4).

In an example embodiment, the graphical processing logic 102 performs font smoothing on the image data. In an example embodiment, font smoothing is performed on individual glyphs. In another example embodiment, the font smoothing is performed on a combination of glyphs. In yet another example embodiment, the font smoothing is performed on a static bitmap image. In still yet another example embodiment, font smoothing is performed on a desktop window image constructed from a plurality of individual glyphs.

In an example embodiment, the graphical processing logic 102 performs animated bitmap processing to the image data. For example, the graphical processing logic 102 may overlay a static desktop image with an appropriate bitmap from an animation series. The graphical processing logic 102 may be further operable to overlay a static desktop image with the appropriate bitmap from the animation series on an image by image basis. In particular embodiments, the static desktop image is cached locally.

In an example embodiment, the image data 104 comprises metadata indicating a processing operation to be performed on the image data. The graphical processing logic 102 determines the processing operation to be performed from the metadata and performs the graphical processing operation specified in the metadata.

In an example embodiment, the graphical processing logic 102 transcodes the image data 104 from a first protocol to a second protocol that is compatible with the desktop client. For example, the graphical processing logic 102 may transcode the image data 104 to a H.264 compatible protocol. As another example, the graphical processing logic 102 may transcode image data 104 received formatted in a H.264 compatible format to a VDI format compatible with the desktop client. Still yet another example, the graphical processing logic 102 may convert image data 104 from a first VDI protocol to a second VDI protocol that is compatible with the desktop client.

Figure 2:
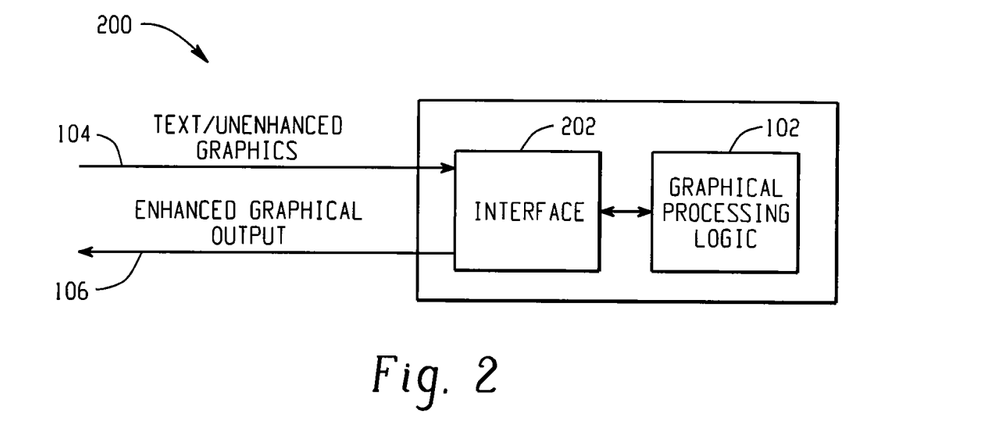
FIG. 2 is a block diagram of an apparatus for performing graphical operations in a VDI environment that includes an interface.

FIG. 2 is a block diagram of an apparatus 200 for performing graphical operations in a VDI environment that includes an interface 202. In the illustrated example embodiment, graphical processing logic 102 receives image data 104 via interface 202. The graphical processing logic 102 performs a graphical operation on the image data and provides the desktop image 106 to the desktop client via interface 202.

Figure 3:
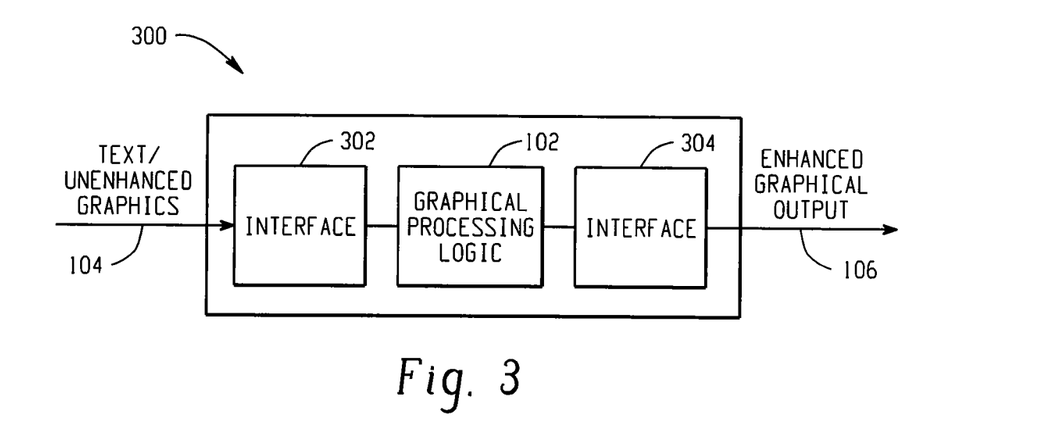
FIG. 3 is a block diagram of an apparatus for performing graphical operations in a VDI environment that includes two interfaces.

FIG. 3 is a block diagram of an apparatus 300 for performing graphical operations in a VDI environment that includes two interfaces 302, 304. In the illustrated example, image data 104 is received via the interface 302. The graphical processing logic 102 performs a graphical processing operation on the image data and provides a desktop image to the desktop client (not shown, see e.g., FIG. 4) via the interface 304.

Figure 4:
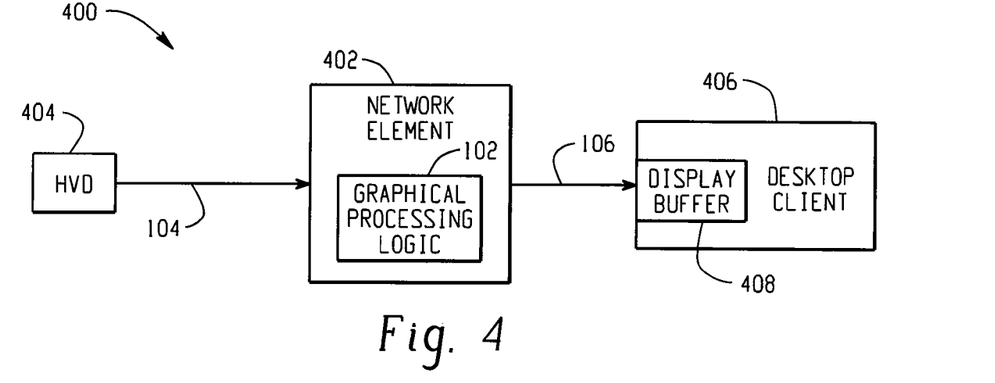
FIG. 4 is a block diagram of a system illustrating an example of a VDI system employing a network element for performing graphical operations on HVD data received from a HVD server and providing an enhanced graphical image to a desktop client.

FIG. 4 is a block diagram of a system 400 illustrating an example of a VDI system employing a network element 402 for performing graphical operations on image data 104 received from a HVD server 404 and provides a desktop image, e.g., an enhanced graphical image, 106 to the desktop client 406. Depending on the deployment of network element 400, either of apparatus 200 or apparatus 300 may be employed for implementing network element 402. In an example embodiment, network element 402 provides a fully rendered bitmap image to a display buffer 408 of desktop client 406. Although, the illustrated example shows a single network element 402, single HVD server 404, and single desktop client 406, those skilled in the art should readily appreciate that the selected number of components in the illustration were selected for ease of illustration and that a system employing a network element 402 with graphical processing logic 102 may include any physically realizable number of HVD desktops, network elements, and desktop clients.

Figure 5:
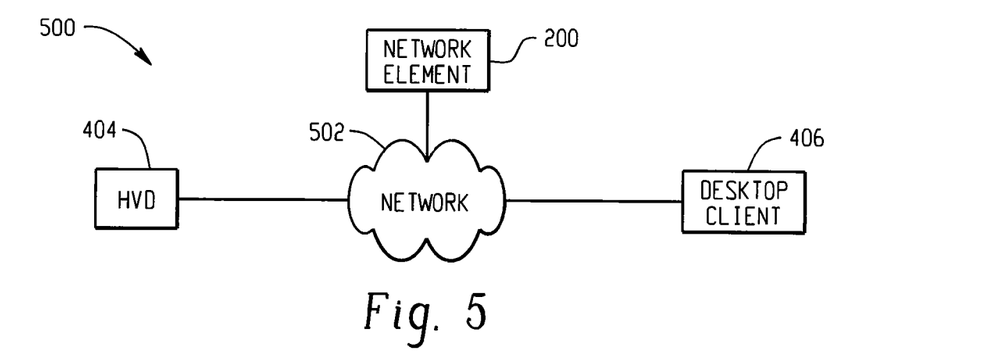
FIG. 5 is a block diagram illustrating an example of a networking environment that can employ a network element for performing graphical operations in a VDI environment with a single interface.

FIG. 5 is a block diagram illustrating an example of a networking environment 500 that can employ a network element 200 for performing graphical operations in a VDI environment with a single interface. In the illustrated example, HVD server 404 is coupled to network element 200 via network 502. Network 502 also couples network element 200 with desktop client 406. Those skilled in the art can readily appreciate that switches and routers (not shown) may be employed to couple HVD server 404 with network element 200, and to couple network element 200 to desktop client 406. Thus, portions of the network 502 coupling HVD server 404 to network element 200 may consume less bandwidth than portions of network 502 coupling network element 200 with desktop client 406.

Figure 6:
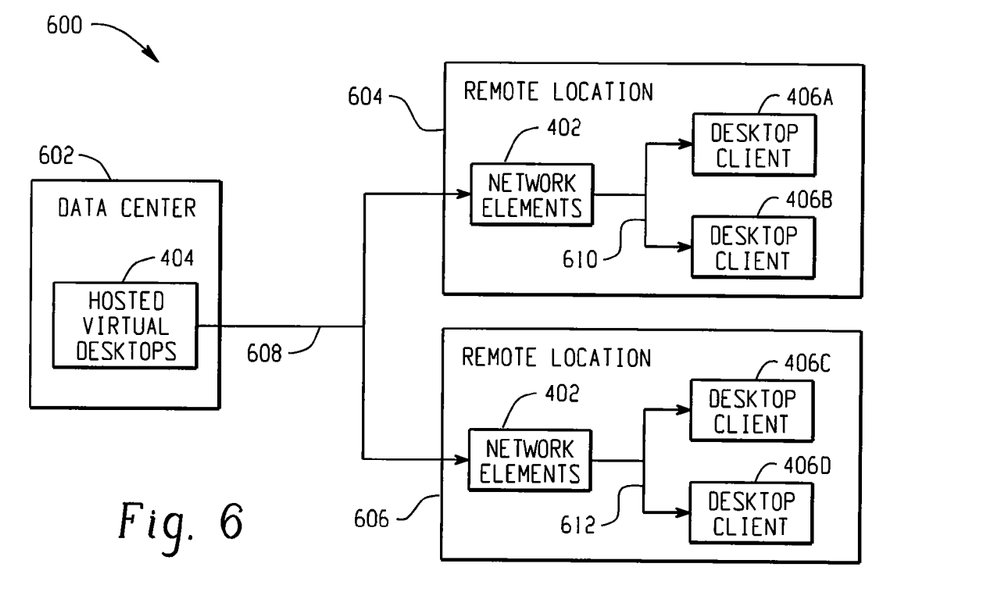
FIG. 6 is a block diagram illustrating an example of a system where network elements performing graphical processing operations are disposed at locations remote from the HVD servers near the desktop clients.

FIG. 6 is a block diagram illustrating an example of a system 600 where at network elements 402 performing graphical processing operations are disposed at locations remote from the at least one HVD server 404 near the desktop clients 406. In the illustrated example, at least one hosted virtual desktop server 404 is located in a data center 602. Desktop clients 406A, 406B are located at a first location 604, and desktop clients 406C, 406D are located at a second location 606.

In this example, network elements 402 are disposed at locations 604, 606. Image data is sent from hosted virtual desktops from servers 404 at location 602 via link 608 to network elements 402 at locations 604, 606. Link 610 couples the network element 402 at location 604 to desktop clients 406A, 406B. Link 612 couples the network element 402 at location 606 to desktop clients 406C, 406D.

The network element 402 at location 604 performs graphical processing and provides desktop images to desktop clients 406A, 406B. The network element 402 at location 606 provides desktop images to desktop clients 406C, 406D.

An aspect of this embodiment is that network elements 402 at locations 604, 606 perform graphical processing operations locally. This can reduce the load on the central processing units (CPUs) at hosted virtual desktop servers 404. In addition, the enhanced graphics are provided on links 610 and 612, which can reduce the amount of bandwidth on link 608 between the data center 602 and locations 604, 606.

Figure 7:
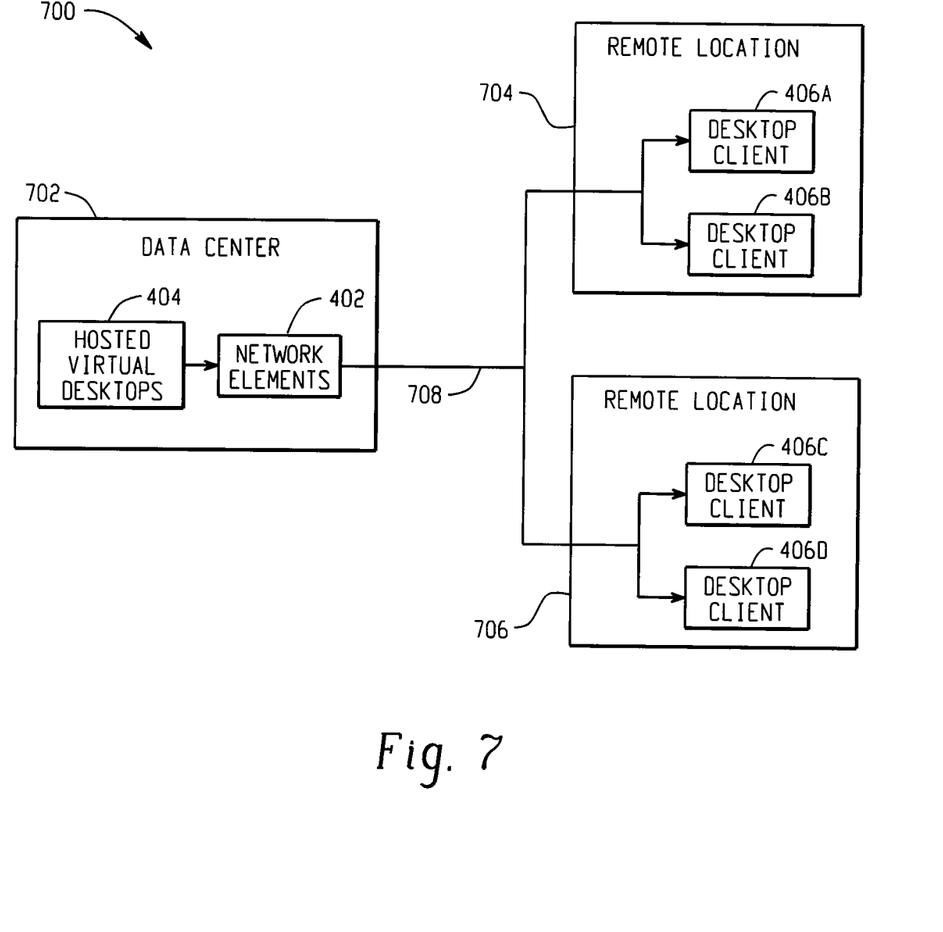
FIG. 7 is a block diagram illustrating an example of a system where network elements performing graphical processing operations are disposed at locations near the HVD servers.

FIG. 7 is a block diagram illustrating an example of a system 700 where network elements performing graphical processing operations are disposed near the HVD servers 404. In the illustrated example, hosted virtual desktops from a data center 702 are provided to remote locations 704, 706. The hosted virtual desktops are provided by servers 404 at data center 702 and image data from the at least one server 404 are provided to at least one network elements 402. The desktop image processed by at least one network element 402 is provided to desktop clients 406A, 406B at location 704 and desktop clients 406C, 406D at location 706 via communication link 708.

The embodiment illustrated in FIG. 7 can reduce the load on the CPUs providing HVD image data. However, because the network element is located at the data center 702, the bandwidth consumed on communication link 708 coupling data center 702 to remote locations 704, 706 would be expected to be higher than the bandwidth consumed on link 608 (FIG. 6) since link 608 is not providing graphically processed (enhanced) desktop images to remote locations 604, 606 (FIG. 6).

Figure 8:
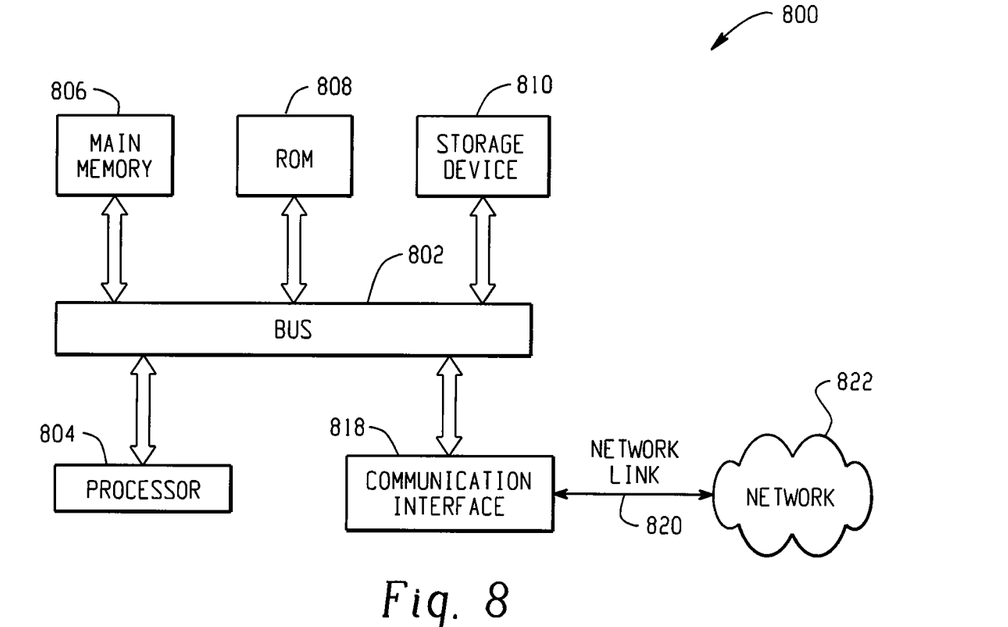
FIG. 8 is a block diagram of a computer system upon which an example embodiment may be implemented.

FIG. 8 is a block diagram of a computer system 800 upon which an example embodiment may be implemented. Computer system 800 can be employed for implementing graphical processing logic 102 (FIGS. 1-4).

Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. For example, main memory 806 may be employed to locally cache bitmap images for providing animated bitmaps. Computer system 800 further includes a read only memory (ROM) 808 or other static storage device coupled to bus 802 for storing static information and instructions for processor 804. A storage device 810, such as a magnetic disk, optical disk, and/or flash storage is provided and coupled to bus 802 for storing information and instructions.

An aspect of the example embodiment is related to the use of computer system 800 for implementing a network appliance for transcoding and/or enriching VDI desktop images. According to an example embodiment, transcoding and/or enhancing VDI desktop images is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to non-volatile media, and volatile media. Non-volatile media include for example optical or magnetic disks, such as storage device 810. Volatile media include dynamic memory such as main memory 806. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 800 also includes a communication interface 818 coupled to bus 802. Communication interface 818 provides a two-way data communication coupling computer system 800 to a network link 820 that is connected to a local network 822. For example, a HVD server (not shown) and a desktop client (not shown) may be coupled with network 822. Communication interface 818 enables computer system 800 to receive image data from an HVD server, process the data to create a desktop image, and provide the image to the desktop client.

In particular embodiments, multiple communication interfaces 818 may be employed. For example, a first communication interface 318 may be coupled with a HVD server providing image data and a second communication interface 318 may be coupled with a desktop client for providing a graphically enhanced desktop image to the desktop client.

Figure 9:
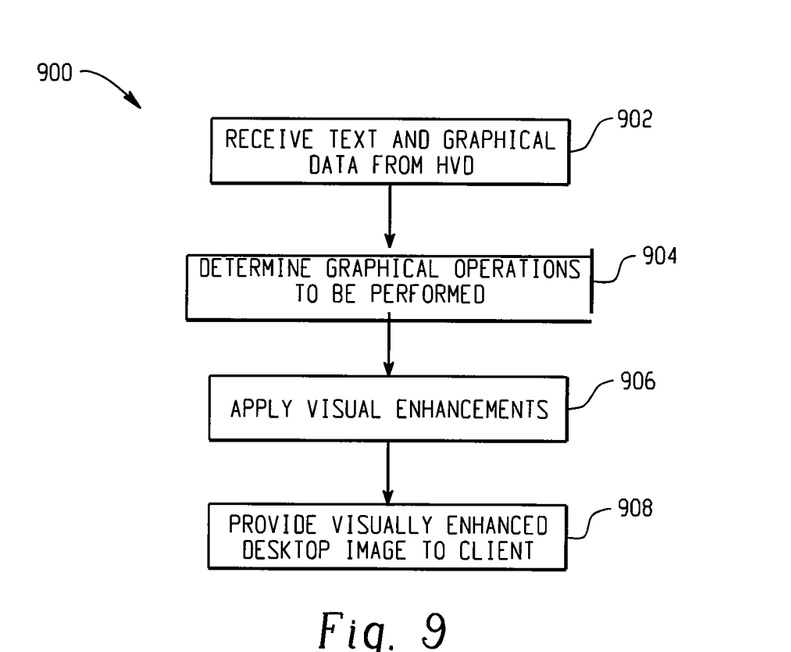
FIG. 9 is a block diagram of a method for implementing a hosted virtual desktop employing a network appliance for providing graphical enhancements.

In view of the foregoing structural and functional features described above, a methodology 900 in accordance with an example embodiment will be better appreciated with reference to FIG. 9. While, for purposes of simplicity of explanation, the methodology 900 of FIG. 9 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. The methodology 900 described herein is suitably adapted to be implemented in hardware, software, or a combination thereof. For example, methodology 900 may be implemented by graphical processing logic 102 (FIGS. 1-4) and/or computer system 800 (FIG. 8).

At 902, image data is received from a HVD server. The image data may suitably comprise such as text and/or graphical data.

At 904, the graphical operations that are to be performed on the image data are determined. In an example embodiment, metadata embedded in the image data may be employed for determining what operations are to be performed. In another example embodiment, the operations may be pre-configured. In yet other embodiments, the data for specifying graphical operations may be sent separately.

At 906, the graphical operations are performed on the image data, generating a virtual desktop image. In an example embodiment, the graphical operations provide VDI desktop image enhancement for 'local' image processing operations. An example of a 'local' image processing operation is font smoothing. Font smoothing tends to be limited to individual glyphs or combinations of glyphs. Font smoothing does not require operations that span large sections of the VDI image nor does it depend on a series of temporally distinct images. Font smoothing can be applied to a static bitmap image or a desktop window image constructed from individual glyphs.

In an example embodiment, the graphical operations may include providing animated images. A series of animated bitmap images that are cached locally may be employed for providing the animated images. For example, a static VDI desktop image can be overlaid with the appropriate bitmap from the animation series on a VDI image by image basis.

In particular embodiments, transparency and background image effects can also be applied to the VDI desktop image. Data, such as metadata, in the image (VDI) stream can be employed to specify the desired effects. Example embodiments may employ any suitable VDI protocol such as ICA (Independent Computing Architecture), PCoIP (PC over IP) and RDP (Remote Desktop Protocol) that have facilities for 'virtual channels' that desktop processes can use to embed additional information like metadata into the VDI protocol session.

Additional embodiments provide VDI image transcoding. For instance, after applying font smoothing or other operations to the VDI desktop image, the image could be transcoded to a different VDI protocol for a given VDI endpoint or could be transcoded to a conventional streaming media format like H.264 for display on any compatible media device. In other embodiments, H.264 data is transcoded to a VDI format compatible with the desktop client and/or a first VDI format is transcoded to a second VDI format.

At 908, the virtual desktop image is sent to the desktop client associated with the hosted virtual desktop. In an example embodiment, the desktop image sent to the desktop client is a fully rendered bitmap image. In particular embodiments, the fully rendered desktop image is provided to a display buffer associated with the desktop client. In other example embodiments, the fully rendered desktop image may be provided to the desktop client in a VDI protocol stream or a conventional media stream, like H.264.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus to graphically enhance and transcode virtual desktop images transmitted from a hosted virtual desktop (HVD) server at a data center to an HVD client at a target location remote from the data center, without increasing a processing load of the HVD server and without increasing consumption of bandwidth between the data center and the target location, the apparatus comprising:
   graphical processing logic; and
   an interface operatively coupled with the graphical processing logic, the interface configured to establish: (i) a remote network connection with the HVD server via a remote network and (ii) a local network connection with an HVD client via a local network;
   wherein the graphical processing logic receives image data, including enhancement data, via the interface and from the HVD server at the data center remote from the target location, by consuming a measure of remote bandwidth of the remote network;
   wherein, prior to the image data received over the remote network from the HVD server being forwarded to the HVD client, the graphical processing logic performs a graphical processing operation on the image data based on the enhancement data and in order to create a rendered, bitmapped virtual desktop image;
   wherein the graphical processing logic transcodes the rendered, bitmapped virtual desktop image from a first VDI protocol to a second VDI protocol compatible with the HVD client; and
   wherein the interface communicates the transcoded virtual desktop image to the HVD client by consuming a measure of local bandwidth greater than the measure of remote bandwidth;
   wherein the virtual desktop image is enhanced and transcoded without increasing a processing load of the HVD server and without consuming any additional bandwidth between the data center and the remote location beyond the measure of remote bandwidth.

2. The apparatus of claim 1, wherein the graphical processing logic performs font smoothing on the image data.

3. The apparatus of claim 2, wherein font smoothing is performed on individual glyphs.

4. The apparatus of claim 2, wherein the font smoothing is performed on a combination of glyphs.

5. The apparatus of claim 2, wherein the font smoothing is performed on a static bitmap image.

6. The apparatus of claim 2, wherein the font smoothing is performed on a desktop window image constructed from a plurality of individual glyphs.

7. The apparatus of claim 1, wherein the graphical processing logic performs animated bitmap processing to the image data.

8. The apparatus of claim 1, wherein the second HVD protocol is an H.264-compatible protocol.

9. The apparatus of claim 1, wherein the interface comprises: (i) a first interface for receiving the image data from the HVD server and (ii) a second interface coupled with the HVD client for providing the rendered desktop image to the HVD client.

10. Logic to graphically enhance and transcode virtual desktop images transmitted from a hosted virtual desktop (HVD) server at a data center to an HVD client at a target location remote from the data center, without increasing a processing load of the HVD server and without increasing consumption of bandwidth between the data center and the target location, the logic encoded in a non-transitory computer-readable medium for execution and when executed by a computer processor operable to:

receive, by an intercepting device at the target location and connected to both a local network and a remote network, image data encoded in a first virtual desktop infrastructure (VDI) protocol, inclusive of enhancement data, wherein the image data is received from the HVD server at the data center remote from the target location and by consuming a measure of remote bandwidth of the remote network;

perform a graphical enhancement operation on the image data at the intercepting device based on the enhancement data and in order to create, a rendered, bitmapped virtual desktop image;

transcode the rendered, bitmapped virtual desktop image to a second VDI protocol compatible with the HVD client, the second VDI protocol being different than the first VDI protocol; and transmit the transcoded virtual desktop image to a frame buffer of the HVD client by consuming a measure of local bandwidth of the local network, greater than the measure of remote bandwidth;

wherein the virtual desktop image is enhanced and transcoded without increasing a processing load of the HVD server and without consuming any additional bandwidth between the data center and the remote location beyond the measure of remote bandwidth.

11. The logic of claim 10, wherein the graphical enhancement operation comprises performing font smoothing.

12. The logic of claim 10, wherein the graphical enhancement operation comprises performing animated bitmap processing to the image data.

13. The logic of claim 10, wherein the graphical enhancement operation is determined based on the enhancement data.

14. A computer-implemented method to graphically enhance and transcode virtual desktop images transmitted from a hosted virtual desktop (HVD) server at a data center to an HVD client at a target location remote from the data center, without increasing a processing load of the HVD server and without increasing consumption of bandwidth between the data center and the target location, the computer-implemented method comprising:

receiving, by an intercepting device at the target location and operatively connected to both a local network and a remote network, text data, graphical data, and enhancement data of a virtual desktop image to be transmitted to the HVD client at the target location, wherein at least the enhancement data is encoded in a first virtual desktop infrastructure (VDI) protocol and is received from the HVD server at the data center remote from the target location and by consuming a measure of remote bandwidth of the remote network;

determining a graphical enhancement operation to perform on a selected one of the text data and the graphical data, based on the enhancement data, whereafter the graphical enhancement operation is performed on the selected one of the text data and graphical data in order to generate a rendered, bitmapped virtual desktop image;

transcoding the rendered, bitmapped virtual desktop image to a second VDI protocol compatible with the HVD client, the second VDI protocol being different than the first VDI protocol; and sending the transcoded virtual desktop image, encoded in the second VDI protocol, from the intercepting device to a frame buffer of the HVD client by consuming a measure of local bandwidth of the local network, greater than the measure of remote bandwidth;

wherein the virtual desktop image is enhanced and transcoded without increasing a processing load of the HVD server and without consuming any additional bandwidth between the data center and the remote location beyond the measure of remote bandwidth.

15. The computer-implemented method of claim 14, wherein a plurality of VDI desktop images is enhanced, transcoded, and locally transmitted by a plurality of intercepting devices to a plurality of HVD clients each at a respective one of a plurality of target locations remote from the data center, without increasing a processing load of the HVD server and without consuming any additional bandwidth between the data center and any of the plurality of target locations.

16. The computer-implemented method of claim 15, wherein the plurality of VDI desktop images includes the VDI desktop image, wherein the plurality of intercepting devices includes the intercepting device, wherein the plurality of HVD clients includes the HVD client, wherein the plurality of target locations includes the target location, wherein the first VDI protocol is incompatible with the HVD client.

17. The computer-implemented method of claim 16, wherein the rendered, bitmapped virtual desktop image comprises a complete, rendered, bitmapped virtual desktop image, wherein the graphical enhancement operation includes performs font smoothing on the image data, wherein font smoothing is performed on each of: (i) individual glyphs; (ii) a combination of glyphs; (iii) a static bitmap image; and (iv) a desktop window image constructed from a plurality of individual glyphs.

18. The computer-implemented method of claim 17, wherein the graphical enhancement operation further includes performing animated bitmap processing to the graphical data, including overlaying a static desktop image with an appropriate bitmap from an animation series on an image-by-image basis, wherein the static desktop image is cached locally on the apparatus, wherein the virtual desktop image comprises a VDI desktop image, wherein the remote network and local network are distinct networks.

19. The computer-implemented method of claim 18, wherein the graphical enhancement operation further includes applying specified transparency effects and specified background image effects to the graphical data, wherein the transparency effects and background image effects are specified in the enhancement data, wherein the text data and graphical data are encoded in the first VDI protocol.

20. The computer-implemented method of claim 19, wherein the intercepting device includes a back-to-back user agent (B2BUA) for the first and second VDI protocols, wherein the first protocol supports virtual channels by which the enhancement data is embedded into a protocol session of the first protocol, wherein the second VDI protocol is an H.264-compatible protocol.

21. The computer-implemented method of claim 20, wherein the text data, graphical data, and enhancement data are received via a first interface, wherein the rendered desktop image is provided to the HVD client via a second interface different from the first interface, wherein each of the first and second VDI protocols is selected from: (i) Independent Computing Architecture (ICA); (ii) Personal Computer over Internet Protocol (PCoIP); and (iii) Remote Desktop Protocol (RDP).

* * * * *